United States Patent [19]

Entenmann et al.

[11] Patent Number: 5,403,999
[45] Date of Patent: Apr. 4, 1995

[54] TELECOMMUNICATIONS SYSTEMS FOR LOTTERIES

[75] Inventors: John K. Entenmann, Glendale Heights, Ill.; John A. Hooke, Rumson, N.J.; Eric E. Kampmeier, Naperville; Barry L. Posterick, Batavia, both of Ill.

[73] Assignee: AT&T Corp., Murray Hill, N.J.

[21] Appl. No.: 648,710

[22] Filed: Jan. 31, 1991

Related U.S. Application Data

[62] Division of Ser. No. 91,621, Sep. 1, 1987, Pat. No. 4,996,705.

[51] Int. Cl.⁶ .................. G06F 15/30; G06K 5/00
[52] U.S. Cl. .................. 235/379; 235/381; 235/382
[58] Field of Search .............. 235/379, 380–381, 235/382, 375; 379/88, 89, 90, 91, 93, 104

[56] References Cited

U.S. PATENT DOCUMENTS

| | | |
|---|---|---|
| 3,920,908 | 11/1975 | Kraus . |
| 4,162,377 | 7/1979 | Mearns . |
| 4,191,860 | 3/1980 | Weber . |
| 4,386,266 | 5/1983 | Chesarek .................. 235/380 X |
| 4,491,725 | 1/1985 | Pritchard .................. 235/375 |
| 4,756,020 | 7/1988 | Fodale . |
| 4,860,341 | 8/1989 | D'Avello et al. ............. 235/380 X |
| 4,875,164 | 10/1989 | Monfort .................. 235/381 X |

Primary Examiner—Joseph A. Popek
Assistant Examiner—Tan Naugen
Attorney, Agent, or Firm—Gordon E. Nelson

[57] ABSTRACT

A lottery system using a public switched network to enter a lottery and to receive an indication of winning while connected on a lottery call. A lottery customer dials a telephone number to enter the lottery. The customer has his eligibility verified by a credit card number or the telephone number of the calling station. The customer is then prompted to speak or key a lottery entry which may be a full number, partial number, or an indication that a lottery comparison number is to be generated by a lottery processor. From the customer's lottery entry, a lottery comparison number is generated. This is compared with a random lottery target number generated by the lottery processor. If the comparison number and target number match, the customer is informed of his winning. Advantageously, lottery customers are quickly notified of their winnings.

7 Claims, 3 Drawing Sheets

TELECOMMUNICATIONS SYSTEMS FOR LOTTERIES

This is a division of application Ser. No. 07/091,621, filed Sep. 1, 1987, U.S. Pat. No. 4,996,705, issued Feb. 26, 1991.

TECHNICAL FIELD

This invention deals with arrangements and methods for conducting lotteries and more specifically with lottery arrangements and methods using telecommunications systems to communicate between customers and a centralized lottery system.

Problem

State run lotteries have become increasingly popular in the past several decades. In these lotteries, the players typically select a group of numbers from a much larger group of possible numbers and pay for each selection. For example, for each drawing of the lottery, the Illinois State Lottery allows its players to select any two combinations of 6 numbers from 1–44 for a charge of $1.00. The winner(s) of the lottery are the person(s) who have selected all six numbers correctly for that drawing.

Compared with other gambling activities, a lottery has the disadvantage that a selection must generally be made long before results are obtained and announced. For example, the Illinois Lottery "Lotto" game has two drawings per week. A bettor can only purchase tickets at least ten minutes and up to three days before each drawing, and must wait until the drawing to find out whether he has won. Only by entering the lottery at a time close to the time of the twice-weekly drawing can a customer get results in a fairly short time. This is in contrast to other gambling activities, such as a roulette wheel or dice, where the bettor teams results momentarily. A problem of the prior art of lottery systems therefore is that no facilities are available for providing a bettor with mechanized immediate results on his lottery bet, particularly over telecommunications facilities.

Solution

The above problem is solved and an advance is made in lottery systems in accordance with one exemplary embodiment of the invention, wherein a lottery player communicates via a telecommunications link with a centralized lottery administration system, communicates a selection to that system over a telecommunications link, and, in a departure from the prior art, has that selection or a number based on that selection compared with a random number generated in the lottery system while the player is still on line. If the result of the comparison indicates a winning lottery entry, the lottery player is informed that the player has won a prize.

BRIEF DESCRIPTION OF THE DRAWING

The invention can be understood from the following detailed description when read with reference to the drawing in which.

DETAILED DESCRIPTION

Figure 1:
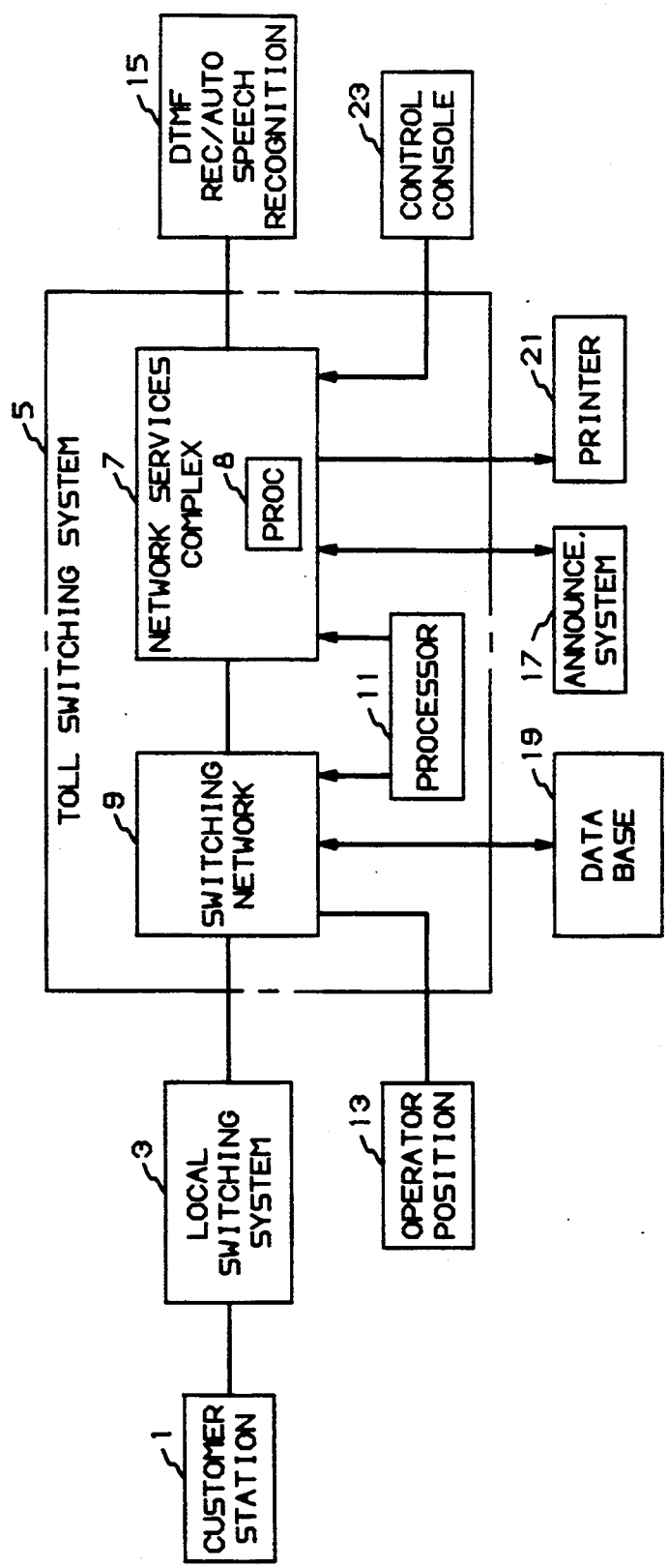
FIG. 1 is a block diagram of a system for practicing the invention.

FIG. 1 is a block diagram of a system for providing customer paid lottery or sponsor paid lottery services. A customer at customer station 1 is connected via a local switching system 3 to a toll switching system 5. The local switching system may be, for example, a 1A ESS$^{TM}$ switch, described in "No. 1 Electronic Switching System", Bell System Technical Journal, Vol. 43, No. 5, pp. 1831–2592, Sep. 1964, and "1A Processor", Bell System Technical Journal, Vol. 56, No. 2, pp. 119–315, Feburary 1977. In order to be able to process calls without requiring credit card or equivalent data, it is desirable that the local switching system be capable of identifying the telephone number of a customer and forwarding this number to a toll switching system, i.e., capable of performing the automatic number identification (ANI) function. In this embodiment, the local switching system is connected to a toll switching system which may, for example, be the 4 ESS switch described in "No. 4 ESS", Bell System Technical Journal, Vol. 56, No. 7, pp. 1015–1320, September 1977, and "No. 4 ESS", Bell System Technical Journal, Vol, 60, No. 6, pp. 1041–1224, July–August 1981. In other embodiments, the functions described herein for the toll switch may be performed by a tandem switching system or the customer's local switching system. In the 4 ESS switch the customer is connected through switching network 9 to a network services complex 7. This connection is set up under the control of a processor system 11. The network services complex has its own processor 8 and is connectable to a voice processing unit 15 comprising a combined dual tone multifrequency (DTMF) receiver/speech recognition unit. The DTMF receiver detects DTMF keyed signals, the speech recognition unit recognizes spoken digits. The network services complex also includes an announcement system 17 for prompting customers and for delivering an advertising message for sponsor paid lotteries. Data base 19, connected via the switching network 9, is used for maintaining customer eligibility data for a lottery and for accumulating billing data for customers of a customer paid lottery. This data base is accessed prior to accepting a lottery call and prior to prompting a customer to enter lottery data. The data base can alternatively be accessed via the network services complex 7. A printer 21 is used to record major events, for example, the winning of a prize by a customer. Control console 23 is used to generate and enter control information into control processor 8 for varying the probability of winning a prize, for example, by extending or narrowing the range of target random numbers, and for varying the amount of the pay off, and for controlling these factors for a plurality of lotteries controlled by the same complex.

Figure 2:
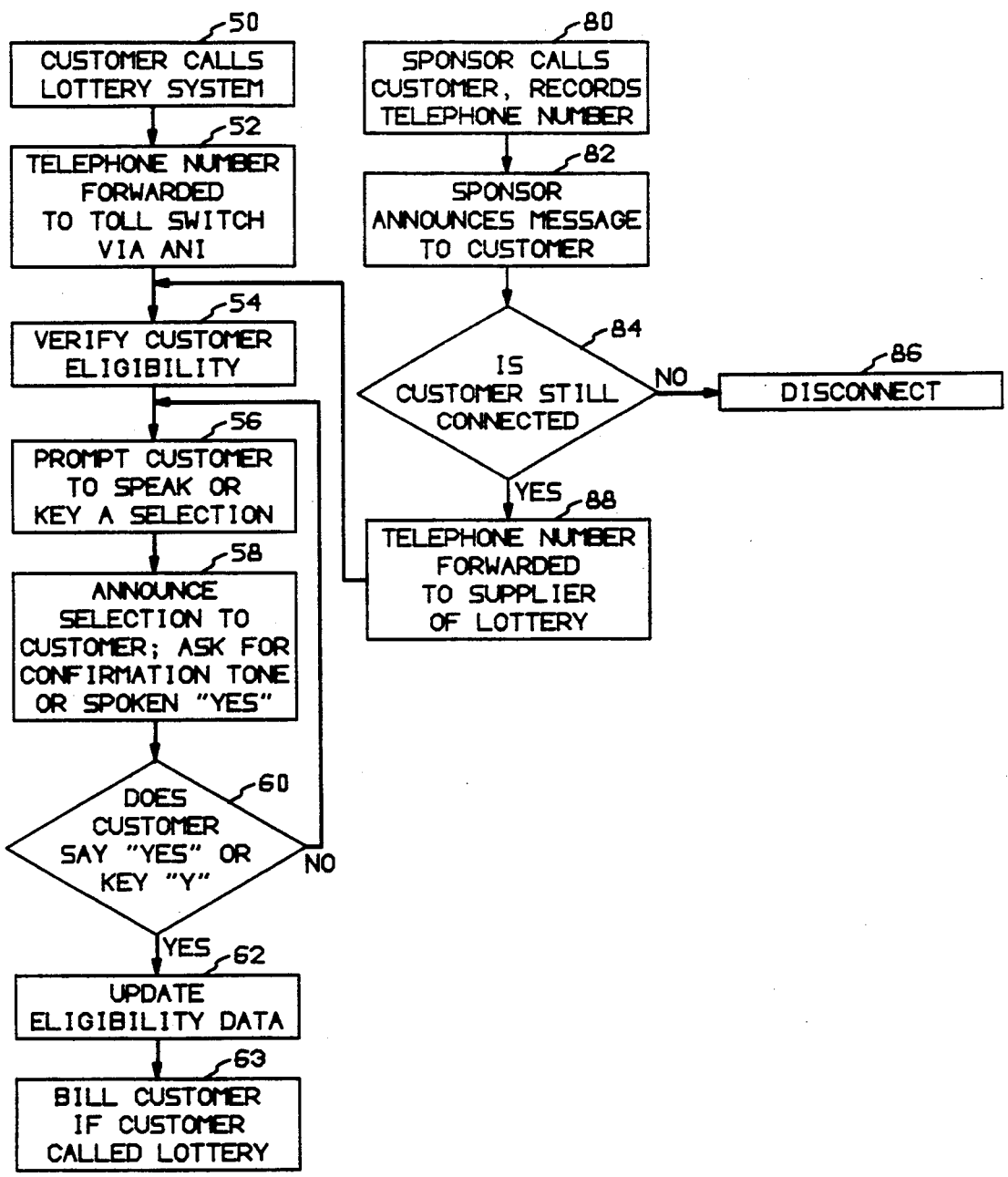
FIGS. 2, and 3 are flow diagrams of steps for processing customer lottery calls.
Figure 3:
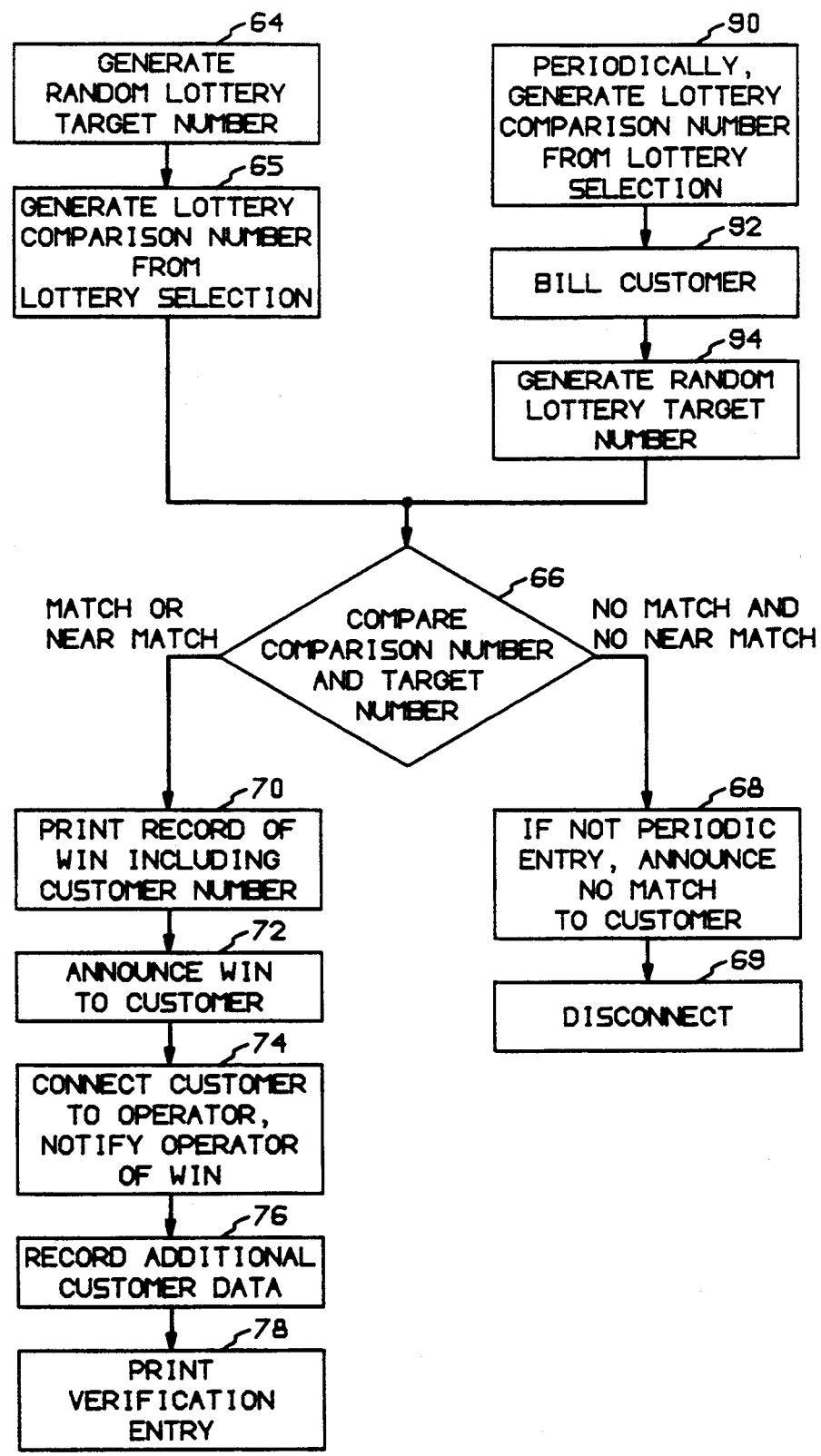

FIGS. 2 and 3 are flow diagrams of a method of offering both customer paid and sponsor paid lotteries. Action box 50 (FIG. 2) represents the customer dialing a code to access the lottery. This code may be the code of a customer paid lottery or it may be the code of an advertisement. The customer's telephone number is forwarded to the toll switching system using automatic number identification (action box 52). The data base 19 is then used to verify the eligibility of the customer for the specific lottery (action box 54). This eligibility may be based on locale in the case of either a customer paid or a sponsor paid lottery since a customer paid lottery may not be legal in certain areas and a sponsor may not be interested in receiving inquiries from certain areas Alternatively, a customer could supply a credit card number and eligibility, charges, and winnings could be referred to that credit card account. The data base is used to verify a particular customer's eligibility and to record charges: for the sponsor paid lottery a particular customer may be eligible only for a limited number of chances; for the customer paid lottery it is important to keep a record of how many times a customer has used the lottery to ensure that a prepaid amount or a credit limit is not exceeded. If a sponsor does not demand a limitation on the use of the lottery by a customer, the customer's directory number is not needed and can be obtained in case of a win by an operator attached to the call at that time.

Next, a customer is prompted to key or speak a lottery selection to be used for generating that customer's lottery comparison number (action box 56). This lottery selection can be a full lottery comparison number, a partial lottery comparison number, or an indication that the data base is to generate the lottery comparison number, either specifically or as a default condition. In the case of sponsor paid lotteries, this prompting may follow earlier announcements in which the sponsor delivers an advertisement and perhaps seeks marketing information by requesting a customer to speak or key digits or the words "yes" or "no". Such information would be detected by DTMF receiver/speech recognition unit 15. The keyed or spoken lottery selection is announced back to the customer (action box 58). If the customer fails to key or speak a go-ahead signal (test 60 "no" output) then the customer is reprompted to key or speak the lottery number. If the customer does key or speak a go-ahead signal ("yes" output of test 60) then billing data is entered for the customer of a customer paid lottery; eligibility data for that customer is also updated (action box 62) to reflect the fact that the customer has used the lottery once more. If this is a sponsor paid lottery, eligibility data is updated to prevent any specific customer from overusing the service. If this is a customer paid lottery entry, the customer is billed (action box 63).

FIG. 3 illustrates one method of determining whether the lottery entry represents a winning entry. Control processor 8 generates a lottery target random number (action box 64) which is compared (test 66) with a lottery comparison number generated (action box 65) from the lottery selection. The lottery target number could also be generated by another processor under the control of the sponsor or the administrator of a lottery, which telephone number control processor 8 would then compare with a lottery comparison number. Note that the customer need not key or speak a full number, although this is an option if marketing tests show that full number entry is preferred. For example, the customer may key or speak the first four digits of a ten digit random number and the control processor 8 will generate a random number for the last six digits. The lottery comparison number generated from the customer's selection data and the random lottery target number generated by the processor for comparison are compared in test 66. If there is no match or no near match, the customer is informed (action box 68) through an announcement and the call is disconnected (action box 69). If there is a match or near match (for example, a match of all but one number), a record is immediately printed on the printer 21 so that even if the call for some reason is interrupted a retrievable record is available and the customer can be called back (action box 70). In the normal situation, the win is then announced to the customer by announcement (action box 72) and the customer is connected to an operator (action box 74). The operator records additional customer data supplied by the customer such as the address and name (action box 76) and a verification entry is printed on printer 21 (action box 78) to verify that an operator has recorded this data. The lottery entry can also be arranged to be tried periodically, say, every month. A lottery comparison number is generated (action box 90) and the customer billed (action box 92). The random lottery target number is generated (action box 94) and the comparison made (test 66, previously described.) If the lottery entry is periodic, there is no need to need to announce the absence of a winning entry to the customer (action box 68). If the customer has won, it is necessary to initiate a call to the customer to announce the win as described with respect to action box 72, since the customer is not connected on a periodic lottery entry.

FIG. 2 also illustrates the steps for processing a call generated by a sponsor. Unsolicited computer-generated calls very frequently encounter an almost immediate disconnect by the called customer. In order to induce the customer to hang on, perhaps in order to receive marketing information or to get a customer purchase order, in accordance with the principles of this invention, an announcement is played promising the customer that if the customer does not disconnect, the customer will be given a chance to win a lottery prize. Such a call is generated and the customer number of the call is recorded (action box 90). The sponsor's message is announced to the customer (action box 92). Next, a test is made whether the customer is still connected (test 94). If not, the call is disconnected (action box 86). If the customer is still connected, the telephone number of the customer is forwarded to the supplier of the lottery and the steps from action box 54 on described supra with respect to customer generated calls are performed. Alternatively, the lottery service can be provided directly by the same equipment which is generating the calls and messages to customers as discussed with respect to action box 90 and 92. Alternatively, the system can be used for calls initiated by customers to a sponsor supplied message.

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. A method of using a switched network to perform a transaction involving a plurality of participants, the participants being capable of being connected to the switched network but being distinct therefrom and the participants having between them information about the transaction which is distinct from the information used by the switched network in establishing connections through the switched network, the method comprising the steps of:

receiving a transaction specifier specifying the transaction from a first one of the participants in the switched network; and in the switched network, responding to the transaction specifier by establishing connections with the participants as required to perform steps including
obtaining a first portion of the information from a first group of at least one of the participants;
obtaining a second portion of the information from a second group of at least one of the participants; and using at least some of the obtained information to provide third information about the transaction to a third group of at least one of the participants.

2. The method set forth in claim 1 wherein: the third information includes less than all of the obtained information.

3. The method set forth in claim 1 wherein: in the step of obtaining the second portion of the information, the second group is different from the first and third groups.

4. The method set forth in claim 1 further comprising the step of:
responding to the second portion in accordance with the second portion's significance for the transaction.

5. The method set forth in claim 1 wherein:
the obtained information includes an identifier for a participant in the transaction; and
the method further includes the step of determining whether the participant identified by the identifier is qualified to participate in the transaction.

6. The method set forth in claim 5 wherein:
the identifier is a credit card number and the step of determining whether the participant identified by the identifier is qualified to participate includes the step of providing the credit card number to a participant in the second group for verification.

7. A method of using a switched network to perform a transaction involving a plurality of participants, said participants including a calling customer, a provider of a service, and an additional participant, said participants being capable of being connected to the switched network but being distinct therefrom and the participants having among them information about the transaction which is distinct from the information used by the switched network in establishing connections through the switched network, the method comprising the steps of
receiving, in the switched network, from the calling customer,
a. a code identifying said service and
b. first transaction information,
in response to receipt of said code and said first transaction information, establishing in said network such connections among said participants as are required to perform steps including
obtaining from said additional participant, in response to the obtained first transaction information, second transaction information needed by said service provider to complete said transaction,
providing the second transaction information to said service provider.

* * * * *